US011960905B2

(12) United States Patent
Grehan

(10) Patent No.: US 11,960,905 B2
(45) Date of Patent: Apr. 16, 2024

(54) NETWORK-MANAGEMENT-CARD-ASSISTED SHUTDOWN OF HYPERCONVERGED INFRASTRUCTURE

(71) Applicant: SCHNEIDER ELECTRIC IT CORPORATION, Foxboro, MA (US)

(72) Inventor: David Grehan, Claremorris (IE)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 282 days.

(21) Appl. No.: 17/110,994

(22) Filed: Dec. 3, 2020

(65) Prior Publication Data

US 2022/0179660 A1    Jun. 9, 2022

(51) Int. Cl.
G06F 9/4401 (2018.01)
G06F 1/30 (2006.01)
G06F 9/455 (2018.01)

(52) U.S. Cl.
CPC ............ *G06F 9/442* (2013.01); *G06F 1/30* (2013.01); *G06F 9/45558* (2013.01); *G06F 2009/45575* (2013.01)

(58) Field of Classification Search
None
See application file for complete search history.

(56) References Cited

U.S. PATENT DOCUMENTS 8,959,513 B1 * 2/2015 Swaminathan ..... G06F 9/45533
718/1

2010/0257517 A1 * 10/2010 Sriram ................ G06F 8/658
717/168

(Continued)

FOREIGN PATENT DOCUMENTS

| EP | 2835716 A1 | 2/2015 |
|----|------------|--------|
| EP | 3588296 A1 | 1/2020 |
| WO | 2015147883 A1 | 10/2015 |

OTHER PUBLICATIONS

Brochure, Eaton delivers advanced power management for Dell EMC VxRail systems, Eaton IPM, p. 2; [retrieved Mar. 2, 2021]; <https://i.crn.com/sites/default/files/ckfinderimages/userfiles/images/crn/custom/2020/Eaton_LC_JAN20_Eaton_IPM_VxRail.pdf>.

(Continued)

*Primary Examiner* — Paul Yen
(74) *Attorney, Agent, or Firm* — Lando & Anastasi, LLP

(57) ABSTRACT

Techniques for network-management-card-assisted shutdown of hyperconverged infrastructure (HCI) are disclosed. A network management card (NMC) includes: a network interface communicatively coupled with an HCI environment; one or more processors; and one or more non-transitory computer-readable media storing instructions. The instructions, when executed by the one or more processors, cause the one or more processors to perform operations including: receiving, from the HCI environment via the network interface, a selection of a set of shutdown instructions from multiple sets of shutdown instructions supported by the NMC, the multiple sets of shutdown instructions being configured to support shutdown processes for at least two different HCI platforms; detecting that the HCI environment is performing a shutdown; and finalizing the shutdown at least by executing the set of shutdown instructions.

18 Claims, 7 Drawing Sheets

(56) References Cited

U.S. PATENT DOCUMENTS

| | | | | |
|---|---|---|---|---|
| 2011/0205573 A1* | 8/2011 | Yanazume | ........... | G06K 15/409 |
| | | | | 358/1.14 |
| 2015/0185807 A1* | 7/2015 | Okuzono | .............. | G06F 1/3231 |
| | | | | 713/320 |
| 2016/0328010 A1* | 11/2016 | Cochran | .................... | G06F 1/26 |
| 2019/0108070 A1* | 4/2019 | Kasahara | ............ | G06F 11/0706 |
| 2021/0165676 A1* | 6/2021 | Yoshikawa | .............. | G06F 9/485 |

OTHER PUBLICATIONS

OMRON Manual, Automatic Shutdown Software for OMRON Uninterruptible Power Supply (UPS) PowerAttendant Lite for Windows User Manual, p. 66; [retrieved Mar. 2, 2021]; <https://assets.omron.eu/downloads/manual/en/v3/powerattendant_lite_users_manual_en.pdf>.

Ap9630 et al: "User's Guide UPS Network Management Card 2", Nov. 1, 2009 (Nov. 1, 2009), XP055141606, Retrieved from the Internet: URL:http://www.jlab.org/Hall-D/Documents/mannuals/APC stuff/AP9630 9631 UPS Network Management Card 2 User's Guide firmware V5.1.1.pdf [retrieved on Sep. 19, 2014] pp. 1-45.

Extended European Search Report from corresponding European Application No. 21208842.1 dated May 12, 2022.

Schneider Electric: "User Guide PowerChute Network Shutdown v4.2", Jul. 31, 2016 (Jul. 31, 2016), pp. 1-71, XP055395072, Retrieved from the Internet: URL:http://www.apc.com/salestools/PMAR-9E5 <http://www.apc.com/salestools/PMAR-9E5LVY/PMAR-9E5LVY_R4_EN.pdf [retrieved on Aug. 1, 2017] pp. 8-65.

\* cited by examiner

NETWORK-MANAGEMENT-CARD-ASSISTED SHUTDOWN OF HYPERCONVERGED INFRASTRUCTURE

BACKGROUND

Hyperconverged infrastructure (HCI) is datacenter infrastructure that "converges" the datacenter stack. Specifically, in HCI, hardware services including compute, storage, and networking are virtualized and run through a hypervisor. Virtualization allows the HCI to operate on a range of underlying hardware, including but not limited to commercial off-the-shelf servers. Virtualization allows the HCI to emulate, in software, storage and networking features that would otherwise require specialized hardware.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to shutting down hyperconverged infrastructure.

SUMMARY

In general, in one aspect a network management card (NMC) includes: a network interface communicatively coupled with a hyperconverged infrastructure (HCI) environment; one or more processors; and one or more non-transitory computer-readable media storing instructions. The instructions, when executed by the one or more processors, cause the one or more processors to perform operations including: receiving, from the HCI environment via the network interface, a selection of a set of shutdown instructions from multiple sets of shutdown instructions supported by the NMC, the multiple sets of shutdown instructions being configured to support shutdown processes for at least two different HCI platforms; detecting that the HCI environment is performing a shutdown; and finalizing the shutdown at least by executing the set of shutdown instructions. Finalizing the shutdown may include performing one or more shutdown operations after all virtual machines in the HCI environment have shut down. The NMC may be coupled with an uninterrupted power supply (UPS). Finalizing the shutdown may include turning off power provided by the UPS to the HCI environment. Detecting that the HCI environment is performing a shutdown may include receiving a shutdown instruction from a virtual shutdown agent (VSA) operating in a virtual machine in the HCI environment. Receiving the selection of the set of shutdown instructions includes receiving contents of the set of shutdown instructions from the HCI environment via the network interface. The set of shutdown instructions may be already stored in the NMC before receiving the selection of the set of shutdown instructions.

In general, in one aspect, one or more non-transitory computer-readable media store instructions that, when executed by one or more processors, cause the one or more processors to perform operations including: selecting, by a shutdown agent operating in a hyperconverged infrastructure (HCI) environment, a set of shutdown instructions from multiple sets of shutdown instructions supported by a network management card (NMC) communicatively coupled with the HCI environment, the multiple sets of shutdown instructions being configured to support shutdown processes for at least two different HCI platforms; sending the set of shutdown instructions from the HCI environment to the NMC; and during a shutdown of the HCI environment, sending an instruction to the NMC to finalize the shutdown, wherein the NMC is configured to finalize the shutdown, responsive to the instruction, at least by executing the set of shutdown instructions. Selecting the set of shutdown instructions may include: detecting a particular HCI platform used by the HCI environment; and selecting the set of shutdown instructions based at least on the set of shutdown instructions supporting the particular HCI platform. Selecting the set of shutdown instructions may include: presenting the multiple sets of shutdown instructions in a user interface; and receiving, via the user interface, user input selecting the set of shutdown instructions. The operations may further include modifying the set of shutdown instructions responsive to user input corresponding to at least one custom instruction. The shutdown agent may be a virtual shutdown agent (VSA) operating in a virtual machine in the HCI environment. The operations may further include, after sending the instruction to the NMC to finalize the shutdown, the VSA terminating the virtual machine in which the VSA is operating. The operations may further include: selecting, by the shutdown agent, a replacement set of shutdown instructions from the multiple sets of shutdown instructions; and sending the replacement set of shutdown instructions from the HCI environment to the NMC. The VSA may be configured to communicate with the NMC using encrypted communication.

In general, in one aspect, one or more non-transitory computer-readable media store instructions that, when executed by one or more processors, cause the one or more processors to perform operations including: receiving, by a network management card (NMC) communicatively coupled with a hyperconverged infrastructure (HCI) environment, a selection of a set of shutdown instructions from multiple sets of shutdown instructions supported by a network management card (NMC), the multiple sets of shutdown instructions being configured to support shutdown processes for at least two different HCI platforms; detecting, by the NMC, that the HCI environment is performing a shutdown; and finalizing the shutdown, by the NCM, at least by the executing the set of shutdown instructions. Finalizing the shutdown may include performing one or more shutdown operations after all virtual machines in the HCI environment have shut down. Finalizing the shutdown may include turning off power provided by an uninterrupted power supply (UPS) to the HCI environment. Detecting that the HCI environment is performing a shutdown may include receiving a shutdown instruction from a virtual shutdown agent (VSA) operating in a virtual machine in the HCI environment. Receiving the selection of the set of shutdown instructions may include receiving contents of the set of shutdown instructions from the HCI environment.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

Figure 1:
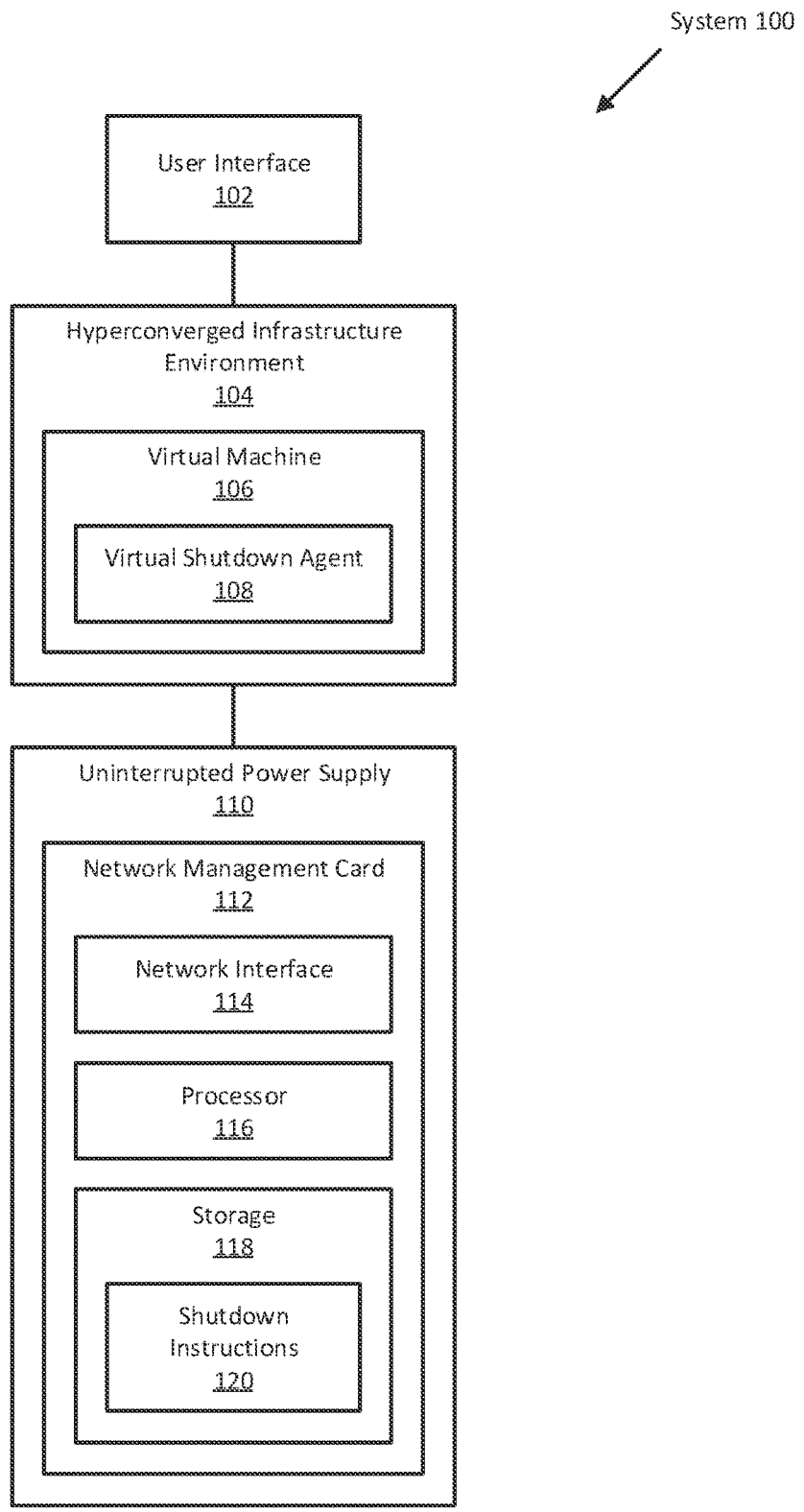
FIG. 1 is a block diagram of an example of a system according to an embodiment.

Current HCI environments generally do not allow for automated shutdown, because of the technical difficulties associated with shutting down virtual machines. For example, HCI environments present the technical challenge of shutting down virtual machines that provide abstractions over the underlying hardware, when the shutdown agent itself is also operating in a virtual machine. In addition, current HCI environments include shutdown hardware and processes that are limited to a single HCI platform, locking hardware purchasers into that specific platform. These are technical problems in the field of datacenter technology generally and shutdowns of HCI infrastructures more specifically. In at least one embodiment described herein, network-management-card (NMC)-assisted shutdown of HCI infrastructure includes improvements over prior systems and is directed to solving these technical problems by providing automated shutdown services that can shut down an entire HCI environment, without needing to deploy shutdown agents to a physical machine outside of the HCI environment. In addition, one or more embodiments described herein use sets of shutdown instructions (e.g., scripts and/or other kinds of instructions) that allow for cross-platform compatibility and reconfiguration of shutdown operations as needed. Moreover, one or more embodiments described herein may be implemented using existing NMC hardware, thus improving the functioning of existing systems without requiring the purchase of new hardware. These technical solutions are not found in current systems and therefore are not routine or conventional. These technical solutions are a practical application of NMC technology that solve the foregoing technical problems and constitutes an improvement in the technical field. In at least one embodiment described herein, NMC-assisted shutdown of HCI infrastructure includes an NMC with a network interface communicatively coupled with an HCI environment; receiving, from the HCI environment via the network interface, a selection of a set of shutdown instructions from multiple sets of shutdown instructions supported by the NMC, the multiple sets of shutdown instructions being configured to support shutdown processes for at least two different HCI platforms; detecting that the HCI environment is performing a shutdown; and finalizing the shutdown at least by executing the set of shutdown instructions. This technical solution is not found in current systems and therefore is not routine or conventional. This technical solution is a practical application of NMC technology that solves the foregoing technical problems and constitutes an improvement in the technical field. In at least one embodiment described herein, NMC-assisted shutdown of HCI infrastructure includes selecting, by a shutdown agent operating in an HCI environment, a set of shutdown instructions from multiple sets of shutdown instructions supported by an NMC communicatively coupled with the HCI environment, the multiple sets of shutdown instructions being configured to support shutdown processes for at least two different HCI platforms; sending the set of shutdown instructions from the HCI environment to the NMC; and during a shutdown of the HCI environment, sending an instruction to the NMC to finalize the shutdown, wherein the NMC is configured to finalize the shutdown, responsive to the instruction, at least by executing the set of shutdown instructions. This technical solution is not found in current systems and therefore is not routine or conventional. This technical solution is a practical application of NMC technology that solves the foregoing technical problems and constitutes an improvement in the technical field. In at least one embodiment described herein, NMC-assisted shutdown of HCI infrastructure includes receiving, by an NMC communicatively coupled with an HCI environment, a selection of a set of shutdown instructions from multiple sets of shutdown instructions supported by an NMC, the multiple sets of shutdown instructions being configured to support shutdown processes for at least two different HCI platforms; detecting, by the NMC, that the HCI environment is performing a shutdown; and finalizing the shutdown, by the NCM, at least by the executing the set of shutdown instructions. This technical solution is not found in current systems and therefore is not routine or conventional. This technical solution is a practical application of NMC technology that solves the foregoing technical problems and constitutes an improvement in the technical field.

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, a hyperconverged infrastructure (HCI) environment 104 includes one or more virtual machines 106. While only one virtual machine 106 is shown in FIG. 1, an HCI environment 104 typically includes multiple virtual machines that provide software abstractions of compute, storage, and networking services over underlying hardware (not shown). In this example, at least one virtual machine 106 includes a virtual shutdown agent (VSA) 108. The VSA 108 is a software agent, executing in a virtual machine 106, that is configured to perform services such as virtual machine migration and/or prioritized virtual machine shutdown. For example, the VSA 108 may be a version of the PowerChute Agent developed by Schneider Electric, or another kind of agent. In an embodiment, the VSA 108 is configured to shut down the HCI environment 104 with assistance from a network management card (NMC) 112, as discussed in further detail herein In an embodiment, the NMC 112 is installed in an expansion port of an uninterrupted power supply (UPS) 110.

The UPS 110 is configured to help ensure an uninterrupted supply of power to the HCI environment 104, in the event that a main power supply (not shown) fails. The UPS 110 may also be configured to accommodate modular hardware via one or more expansion ports. For example, the UPS 110 may be a model in the Smart-UPS line of UPS's, manufactured by Schneider Electric, that includes a SmartSlot port for an optional interface card. The NMC 112 may be a Network Management Card 3 or other model of NMC manufactured by Schneider Electric. Alternatively, the UPS 110 may be another make or model of UPS that supports an NMC 112, and/or the NMC 112 may be another make or model of card providing shutdown assistance as described herein. Alternatively, the NMC 112 may be installed in a server chassis, a stand-alone enclosure, or some other component of the system 100. Installing the NMC 112 in the UPS 110, or otherwise communicatively coupling the NMC 112 with the UPS 110, may allow the NMC 112 to instruct the UPS 110 to power down the HCI environment 104 as part of a shutdown process, as described herein. The NMC 112 includes software and hardware configured to manage features of the HCI environment 104. Specifically, the NMC 112 is configured to assist with shutdown of the HCI environment 104, as described in further detail herein.

As illustrated in FIG. 1, the NMC 112 may include a network interface 114. The network interface 114 may include an Ethernet port, wi-fi radio, Bluetooth® transmitter, and/or another kind of network interface or combination thereof. The network interface 114 allows the NMC 112 to communicate over a network with one or more components of the system 100. The NMC 112 includes one or more processors 116 that allow(s) the NMC 112 to execute software and/or firmware instructions (not shown) for assisting with shutdown of the HCI environment 104. In addition, the NMC 112 includes storage 118. The storage 118 may be any kind of storage medium, or combination thereof, configured to store one or more sets of shutdown instructions 120. The same storage 118 and/or other storage (not shown) may be configured to store operating instructions (e.g., firmware and/or a software operating system) for the NMC 112.

A set of shutdown instructions 120 refers to a series of instructions for assisting with shutdown of the HCI environment 104. For example, a set of shutdown instructions 120 may include instructions for shutting down services, shutting down virtual machines, logging shutdown events, shutting down the HCI environment 104, and/or performing another kind of shutdown action or combination thereof. A set of shutdown instructions 120 may include a secure shell (SSH) script, another kind of script, and/or another kind of instructions or combination thereof. In one example, the set of shutdown instructions includes code to execute a representational state transfer (REST) application programming interface (API) call to one or more virtual machines 106 (e.g., over hypertext transfer protocol secure (HTTPS)). The NMC 112 may be configured to support multiple sets of shutdown instructions. For example, different sets of shutdown instructions may be needed depending on the HCI platform executing in the HCI environment 104. As used herein, an HCI platform is a vendor-specific implementation of HCI technology, each of which may not be compatible with HCI platforms implemented by other vendors. If the system 100 includes multiple shutdown agents, sets of shutdown instructions may be configurable on a per-agent basis. Alternatively or additionally, configuring a set of shutdown instructions 120 may include specifying a maximum amount of time the set of shutdown instructions 120 is allowed to run (e.g., 5 minutes or another predetermined maximum duration).

The NMC 112 may be configurable to install and/or select from among multiple available sets of shutdown instructions, in order to execute the correct set of shutdown instructions for the particular HCI environment 104 where the NMC 112 is being used. The NMC 112 may be configured to store multiple sets of shutdown instructions that are available to choose from. Alternatively or additionally, the NMC 112 may be configured to receive a set of shutdown instructions 120 from the VSA 108 or another component of the system 100.

Table 1, below, includes an example of a set of shutdown instructions (in this example, a script) for a Nutanix HCI platform, according to an embodiment.

TABLE 1

Nutanix Set of shutdown instructions

```
$CVMUser="nutanix"
$svmIPs="192.168.10.1,192.168.10.2,192.168.10.3"
$ahvIPs="192.168.10.10,192.168.10.11,192.168.10.12"
function clusterStop {
  expect -c "
    set timeout 10
    spawn ssh -o StrictHostKeyChecking=no -i \"$SshKey\"
    $CVMUser@$IPActiveCVM
    expect "$"
    send \"/usr/local/nutanix/cluster/bin/cluster stop\n\"
    set timeout $ClusterStopTime
    expect \"proceed\"
    send \"Y\n\"
    expect \"Success!\"
    send \"exit\n\ "
    "}
clusterStopped=0
echo "Testing ssh connection to CVM(s)"
for cvmIP in ${svmIPs [@] }
do
  status=$(ssh -o BatchMode=yes -o StrictHostKeyChecking = no -o
  ConnectTimeout=5 -I "$SshKey" $CVMUser@$cvmIP echo ok 2>&1)
  case $status in
    *"ok") IPActiveCVM=$cvmIP
    if [ "$clusterStopped" -eq "0" ]
    then
```

TABLE 1-continued

Nutanix Set of shutdown instructions

```
        clusterStop
        clusterStopped = 1
      fi
      ssh –o BatchMode=yes –o StrictHostKeyChecking=no –o
      ConnectTimeout=5 –i "$SshKey" $CVMUser@$cvmIP sudo shutdown –h
      now
      ;;
      *"Permission denied"*) echo "$cvmIp responded with $status";;
        *) echo "$cvmIp responded with $status" ;;
      esac
   done
   for ahvIP in ${ahvIPs [@] }
   do
      echo "Sending shutdown to $ahvIP"
      ssh –o BatchMode=yes –o StrictHostKeyChecking=no –o ConnectTimeout=5 -
      i "$SshKey" $AHVUser @$ahvIP sudo shutdown –h now
   done
   exit
```

Table 2, below, includes an example of a set of shutdown instructions (in this example, a script) for a VSAN HCI platform, according to an embodiment.

TABLE 2

VSAN Setofshutdowninstructions

```
$ESXIUser="root"
$hostIPs="192.168.10.10,192.168.10.11,192.168.10.12"
for hostIP in ${hostIPs[@]}
do
   echo "Sending shutdown to $hostIP"
   ssh –o BatchMode=yes –o StrictHostKeyChecking=no –o ConnectTimeout=5 -
   i "$SshKey" $ESXIUser@$hostIP esxcli system
   maintenanceMode set ––vsanmode=noAction -e true
   sleep 30
   ssh –o BatchMode=yes –o StrictHostKeyChecking=no –o ConnectTimeout=5 -
   i "$SshKey" $ESXIUser@$hostIP esxcli system shutdown
   poweroff –r=PowerChute
   sleep 30
done
Exit
```

In one example, to trigger a shutdown action, the VSA 108 sends an HTTP POST request to the NMC 112. For example, the VSA 108 may send a request such as:
 /Forms/macontrol1_control_run_shutdown_action=[pcns_agent_ip], [delay]
where [pcns_agent_ip] is the Internet Protocol (IP) address of the registered VSA 108, and [delay] is a delay (e.g., in seconds or another metric) before the NMC 112 should start to execute the set of shutdown instructions 120. The delay allows the VSA 108 enough time to power down its virtual machine 106, before any service(s) that should not be shut down before the virtual machine 106 (e.g., cluster services) are stopped by the NMC 112.

In an embodiment, a user interface 102 refers to hardware and/or software configured to facilitate communications between a user and management features of the HCI environment 104. For example, via the user interface 102, a user may be able to provide user input that selects from among multiple available sets of shutdown instructions, and/or a user may be able to provide one or more user-specified instructions for a set of shutdown instructions (for example, a user-specific command for a custom script).

In general, a user interface 102 renders user interface elements and receives input via user interface elements. A user interface 102 may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms. Different components of the user interface 102 may be specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a user interface 102 may be specified in one or more other languages, such as Java, Python, Perl, C, C++, and/or any other language or combination thereof.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 2:
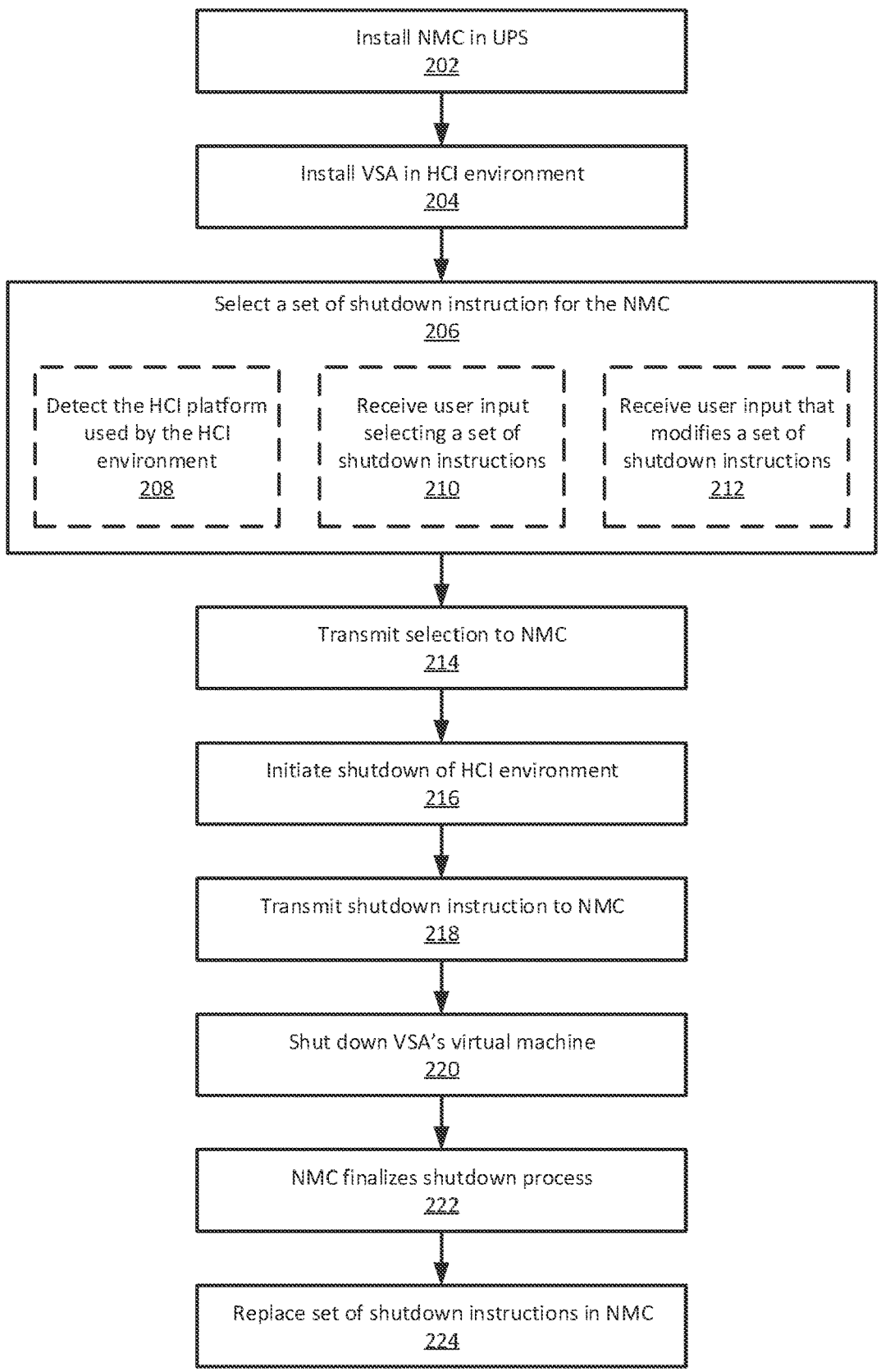
FIG. 2 is a flow diagram of an example of operations for network-management-card-assisted shutdown of hyperconverged infrastructure according to an embodiment.

FIG. 2 is a flow diagram of an example of operations for NMC-assisted shutdown of hyperconverged infrastructure, according to an embodiment. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, the NMC is installed in a UPS (Operation 202). As discussed above, installing the NMC may include inserting the NMC into an expansion port. Alternatively, as discussed above, the NMC may be installed in another component or as a stand-alone component. A virtual shutdown agent (VSA) is installed in the HCI environment (Operation 204). Installing the VSA may include installing the software agent in a virtual machine.

As discussed above, the NMC uses a set of shutdown instructions to assist with shutdown of the HCI environment. A set of shutdown instructions may be selected (Operation 206) for the NMC in multiple ways. For example, the set of shutdown instructions may be selected based on the HCI platform in use. A component (e.g., the VSA, NMC, or another system component) may detect the HCI platform used by the HCI environment (Operation 208) and select a set of shutdown instructions that is designed for that HCI platform. For example, a VSA may query a controller VM to determine which HCI platform is in use. Alternatively, a component (e.g., the VSA, NMC, or another system component) may receive user input selecting a particular set of shutdown instructions to use (Operation 210). The system may also receive user input that modifies a set of shutdown instructions (Operation 212) or provides an entirely user-specified set of shutdown instructions. If a set of shutdown instructions is selected that is not already installed on the NMC, then the set of shutdown instructions may be transmitted to the NMC (Operation 214), over a network or other kind of connection.

To perform a shutdown of the HCI environment, shutdown is first initiated (Operation 216). Shutdown may be initiated responsive to user input and/or by an automated process that detects a shutdown condition (e.g., a security breach, an unsafe operating condition, running on UPS power for a predetermined threshold amount of time, and/or another predetermined rule for initiating a shutdown of the HCI environment). Initiating the shutdown causes the VSA to instruct one or more other virtual machines (VMs) executing in the HCI environment to shut down.

In an embodiment, the VSA does not instruct all VMs to shut down. One or more VMs (e.g., one or more controller VMs and/or one or more VMs managing cluster services) may need to remain operational until after the VSA's VM is shut down, at which point the VSA would no longer be available to finalize the shutdown process. Without the ability to delegate final steps of the shutdown process outside of the VMs, the HCI environment cannot be shutdown "cleanly," i.e., with each VM going through a complete shutdown process and in the proper order. Terminating VMs without a clean shutdown can cause problems such as lost and/or corrupted data, unexpected system behavior, etc.

A system and method for finalizing shutdown of the HCI environment, with assistance from the NMC to allow all VMs to shutdown cleanly, are provided herein. During the shutdown process, the VSA transmits a shutdown instruction to the NMC (Operation 218). The VSA's VM then shuts itself down (Operation 220) and the NMC finalizes the shutdown process (Operation 222) without needing the VSA to remain running. Finalizing the shutdown process may include various operations, such as shutting down one or more controller VMs, shutting down one or more VMs managing cluster services, and/or other operations depending on the HCI platform and configuration. In an embodiment, the NMC negotiates a connection with each VM to be shut down, and instructs each VM to shut down via the connection. This approach allows for the VMs to shut down cleanly/gracefully, using appropriate commands/syntax for the HCI platform in use. The connection may be an SSH connection, a REST API call, or another type of connection, depending for example on the HCI platform. In one example using SSH, to negotiate an SSH connection, the NMC may use an SSH keypair. An SSH keypair allows for passwordless login, without requiring the NMC to store login credentials. Alternatively, another kind of authentication and/or connection security protocol may be used. When all VMs are shut down, the NMC may instruct the UPS to power down the HCI environment, at which point the HCI environment is fully shut down.

In an embodiment, the use of sets of shutdown instructions allows for replacement and/or reconfiguration of the shutdown operations performed by the NMC. Specifically, some or all of the set of shutdown instructions used by the NMC may be replaced (Operation 224). One or more specific instructions may be replaced, or the whole set of shutdown instructions may be replaced. For example, some or all of the set of shutdown instructions may be replaced to apply a patch. As another example, the NMC may be physically moved to a different HCI environment that uses a different HCI platform, and the set of shutdown instructions may be replaced with a set of shutdown instructions that supports the different HCI platform. The use of sets of shutdown instructions may allow the NMC to be compatible with HCI platforms that did not even exist at the time the NMC was manufactured, thus increasing the NMC's functionality and operational life.

A detailed example is described below for purposes of clarity. Components and/or operations described below should be understood as examples that may not be applicable to one or more embodiments. Accordingly, components and/or operations described below should not be construed as limiting the scope of one or more embodiments.

Figure 3A:
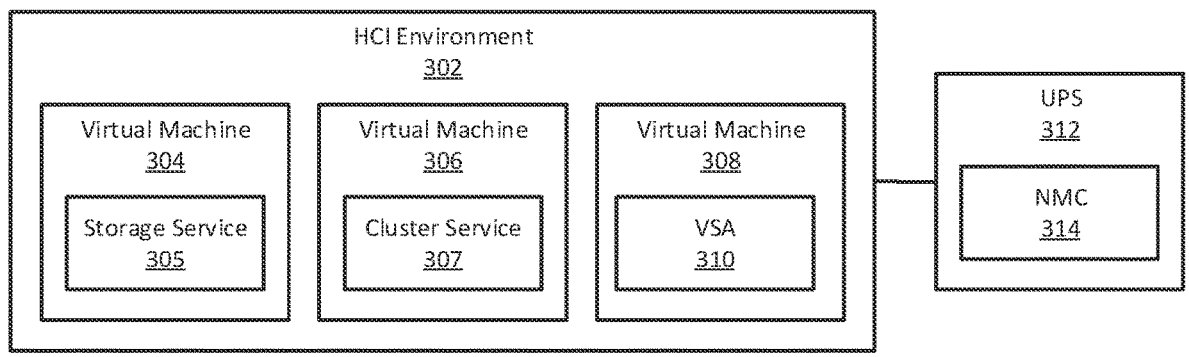
FIGS. 3A-3E are block diagrams of an example according to an embodiment.
Figure 3B:
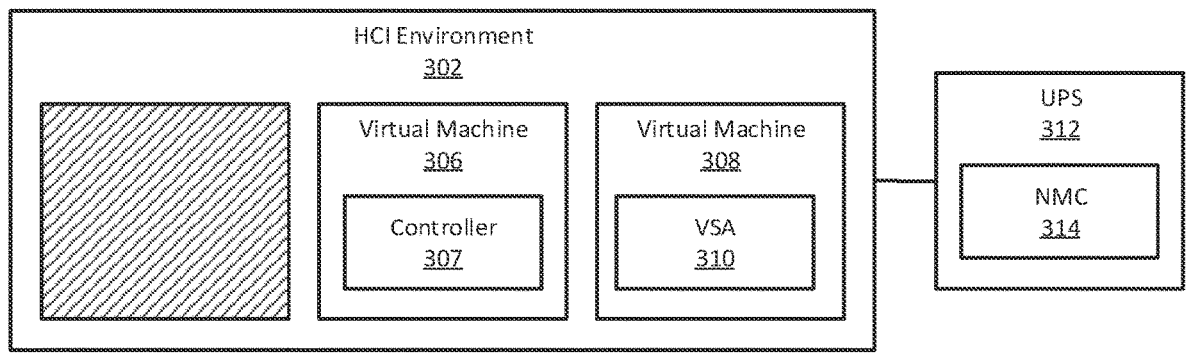
Figure 3C:
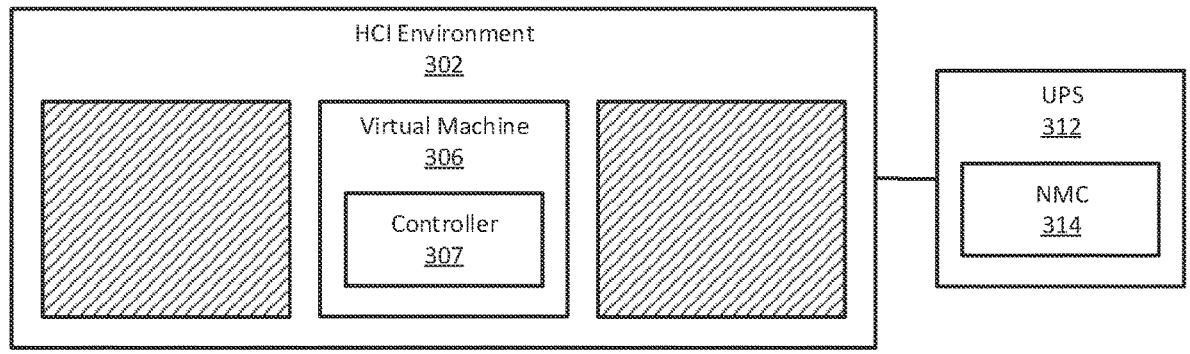
Figure 3D:
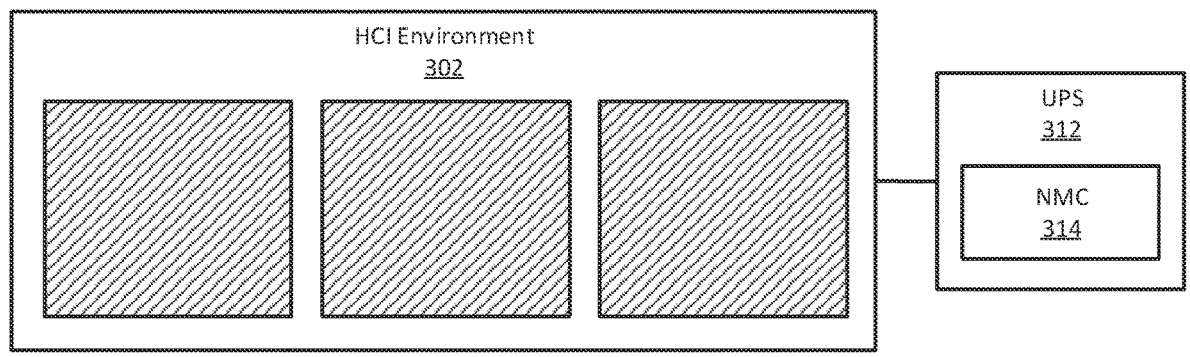
Figure 3E:
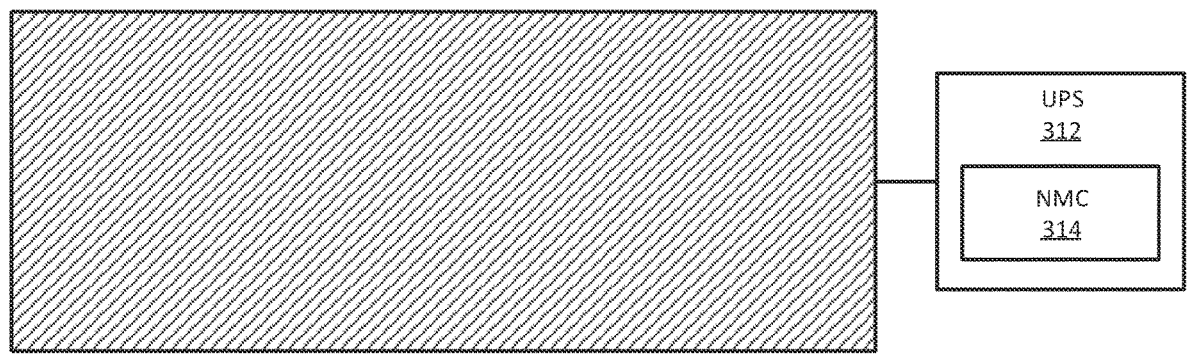

In the example starting with FIG. 3A, an HCI environment 302 includes three virtual machines (VMs). VM 304 is executing a virtualized storage service 305. VM 306 is executing a cluster service 307. VM 308 is executing a virtual shutdown agent (VSA) 310. The HCI environment 302 is coupled with a UPS 312 having an NMC 314 installed therein. During a shutdown process, as illustrated in FIG. 3B, the VSA 310 first sends a shutdown instruction to virtual machine 304. The VSA 310 does not send a shutdown instruction to virtual machine 306, because the cluster service 307 needs to be shut down after the VSA 310 is shut down. After shutting down virtual machine 304, the VSA 310 instructs the NMC 314 to finalize the shutdown process and then, as illustrated in FIG. 3C, shuts itself down. The NMC 314 executes its set of shutdown instructions, which includes (a) shutting down the controller VM 306, as illustrated in FIG. 3D, and then (b) using the UPS 312 to power down the HCI environment 302, as illustrated in FIG. 3E.

Figure 4:
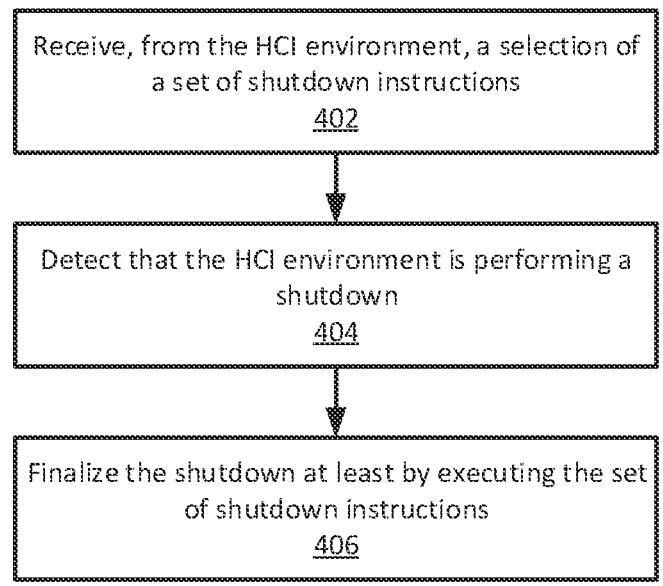
FIG. 4 is a flow diagram of an example of operations for network-management-card-assisted shutdown of hyperconverged infrastructure according to an embodiment.

FIG. 4 is a flow diagram of an example of operations for NMC-assisted shutdown of hyperconverged infrastructure, according to an embodiment. One or more operations illustrated in FIG. 4 may be modified, rearranged, or omitted all together. Accordingly, the particular sequence of operations illustrated in FIG. 4 should not be construed as limiting the scope of one or more embodiments.

In an embodiment, one or more operations illustrated in FIG. 4 and described herein are performed by an NMC communicatively coupled with an HCI environment. The NMC may receive, from the HCI environment via a network interface of the NMC, a selection of a set of shutdown instructions supported by the NMC (Operation 402). The set of shutdown instructions may be one of multiple sets of shutdown instructions supported by the NMC, and may be configured to support shutdown processes for at least two different HCI platforms. The NMC may receive the selected set of shutdown instructions from the HCI environment, via the network interface. Alternatively, the selected set of shutdown instructions may already be stored in the NMC at the time it is selected.

After receiving the selection of the set of shutdown instructions, the NMC may detect that the HCI environment is performing a shutdown (Operation 402). For example, the NMC may receive a shutdown instruction from a virtual shutdown agent (VSA) operating in a virtual machine in the HCI environment.

Responsive to detecting that the HCI environment is performing a shutdown, the NMC may finalize the shutdown, at least by executing the selected set of shutdown instructions (Operation 406). As described herein, the NMC may perform one or more shutdown operations after all virtual machines in the HCI environment have shut down. Finalizing the shutdown may include turning off power provided by a UPS (in which the NMC may be disposed) to the HCI environment.

Figure 5:
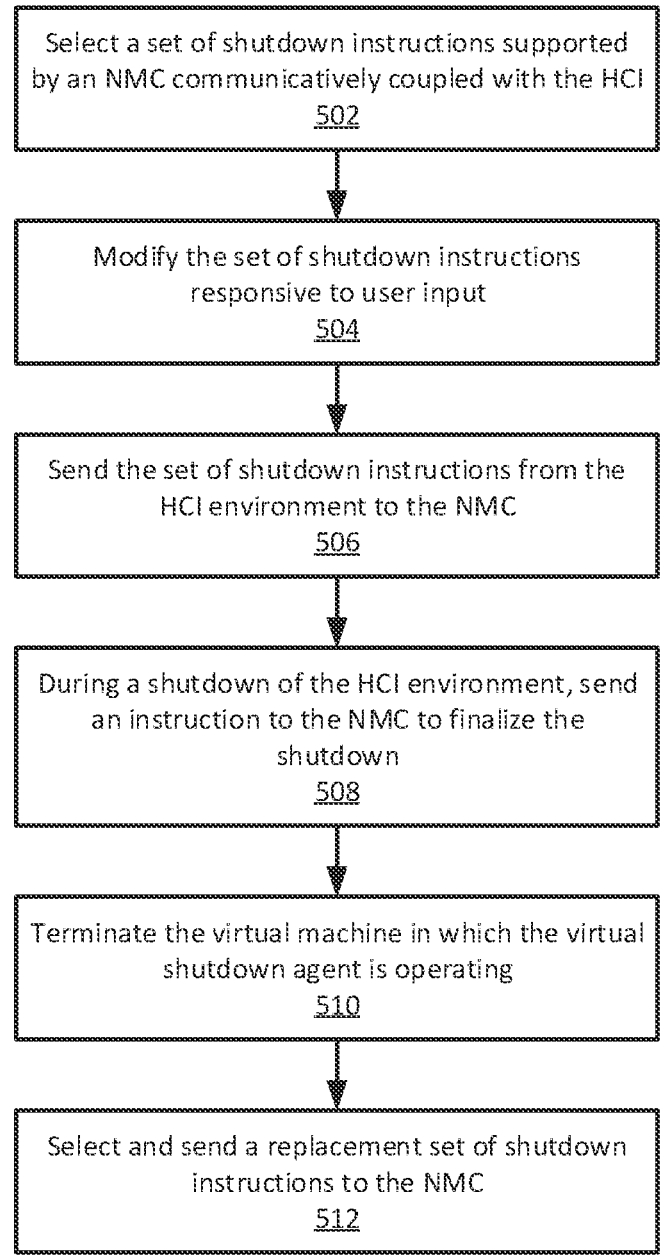
FIG. 5 is a flow diagram of an example of operations for network-management-card-assisted shutdown of hyperconverged infrastructure according to an embodiment.

FIG. 5 is a flow diagram of an example of operations for NMC-assisted shutdown of hyperconverged infrastructure, according to an embodiment. One or more operations illustrated in FIG. 5 may be modified, rearranged, or omitted all together. Accordingly, the particular sequence of operations illustrated in FIG. 5 should not be construed as limiting the scope of one or more embodiments.

In an embodiment, one or more operations illustrated in FIG. 5 and described herein are performed by a shutdown agent (e.g., a virtual shutdown agent) and/or one or more other processes executing in an HCI environment. These processes may be referred to collectively as "HCI-side processes," in contrast to NMC-side processes executing in an NMC. The HCI-side processes may select a set of shutdown instructions supported by an NMC communicatively coupled with the HCI environment (Operation 502). The selected set of shutdown instructions may be one of multiple sets of shutdown instructions supported by the NMC, and may be configured to support shutdown processes for at least two different HCI platforms. To select the set of shutdown instructions, the HCI-side processes may detect a particular HCI platform used by the HCI environment and select a set of shutdown instructions that supports the detected HCI platform. Alternatively, the HCI-side processes may present multiple sets of shutdown instructions in a user interface and receive, via the user interface, user input selecting a particular set of shutdown instruction. Optionally, the HCI-side processes may further receive user input corresponding to one or more custom instructions and modify the set of instructions responsive to the user input (Operation 504).

The HCI-side processes may send the set of shutdown instructions from the HCI environment to the NMC (Operation 506). Alternatively, the HCI-side processes may send a selection of a set of shutdown instructions that is already stored in the NMC, causing the NMC to mark that set of shutdown instructions as selected. During a shutdown of the HCI environment, the HCI-side processes may send an instruction to the NMC to finalize the shutdown (Operation 508). Sending the instruction to the NMC may cause the NMC to finalize the shutdown, responsive to the instruction, at least by executing the selected set of shutdown instructions.

In an embodiment, the shutdown agent is a virtual shutdown agent (VSA) operating in a virtual machine in the HCI environment. Optionally, after sending the instruction to the NMC to finalize the shutdown, the HCI-side processes may terminate the virtual machine in which the VSA is operating (Operation 510).

As discussed above, the NMC may support multiple sets of shutdown instructions, including shutdown instructions that are not already stored in the NMC. Optionally, the HCI-side processes may select a replacement set of shutdown instructions and send the replacement set of shutdown instructions from the HCI environment to the NMC (Operation 512), causing the NMC to use the replacement set of shutdown instructions going forward.

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 6:
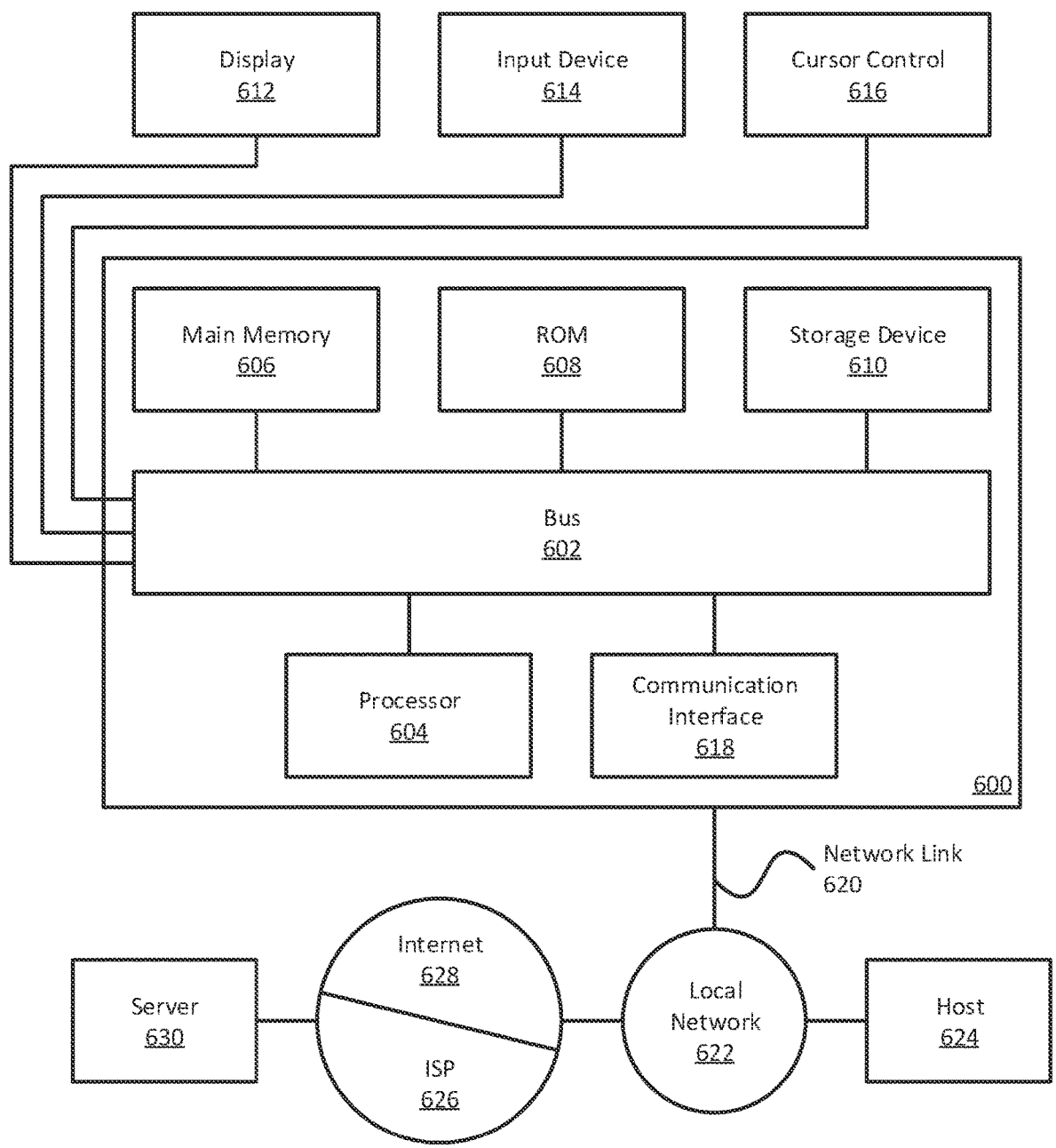
FIG. 6 is a block diagram of an example of a computer system according to an embodiment.

For example, FIG. 6 is a block diagram of an example of a computer system 600 according to an embodiment. Computer system 600 includes a bus 602 or other communication mechanism for communicating information, and a hardware processor 604 coupled with the bus 602 for processing information. Hardware processor 604 may be a general-purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in one or more non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display (LCD), plasma display, electronic ink display, cathode ray tube (CRT) monitor, or any other kind of device for displaying information to a computer user. An input device 614, including alphanumeric and other keys, may be coupled to bus 602 for communicating information and command selections to processor 604. Alternatively or additionally, computer system 600 may receive user input via a cursor control 616, such as a mouse, a trackball, a trackpad, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Alternatively or additionally, computer system 4 may include a touchscreen. Display 612 may be configured to receive user input via one or more pressure-sensitive sensors, multi-touch sensors, and/or gesture sensors. Alternatively or additionally, computer system 600 may receive user input via a microphone, video camera, and/or some other kind of user input device (not shown).

Computer system 600 may implement the techniques described herein using customized hard-wired logic, one or more ASICs or FPGAs, firmware, and/or program logic which in combination with other components of computer system 600 causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 602. Transmission media may also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 600 may receive the data from the network and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622, and communication interface 618.

The received code may be executed by processor 604 as it is received, and/or stored in storage device 610, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. A network management card (NMC) comprising:
 a network interface communicatively coupled with a hyperconverged infrastructure (HCI) environment that uses a first HCI platform;
 one or more processors; and
 one or more non-transitory computer-readable media storing instructions that, when executed by the one or more processors, cause the one or more processors to perform operations comprising:
  receiving, from the HCI environment via the network interface, a selection of a first set of shutdown instructions from a plurality of sets of shutdown instructions, each of the plurality of sets of shutdown instructions being supported for execution by the NMC, the selected first set of the plurality of sets of shutdown instructions being configured to support shutdown processes compatible with the first HCI platform and at least a second set of the plurality of sets of shutdown instructions being configured to support shutdown processes compatible with a second HCI platform;
  after receiving the selection of the first set of shutdown instructions, detecting that the HCI environment is performing a shutdown, wherein detecting that the HCI environment is performing a shutdown comprises receiving a shutdown finalization instruction from a virtual shutdown agent (VSA) operating in a virtual machine in the HCI environment; and
  finalizing the shutdown at least by executing the first set of shutdown instructions.

2. The NMC of claim 1, wherein finalizing the shutdown comprises performing one or more shutdown operations after all virtual machines in the HCI environment have shut down.

3. The NMC of claim 1, wherein the NMC is coupled with an uninterrupted power supply (UPS).

4. The NMC of claim 3, wherein finalizing the shutdown comprises turning off power provided by the UPS to the HCI environment.

5. The NMC of claim 1, wherein receiving the selection of the first set of shutdown instructions comprises receiving contents of the first set of shutdown instructions from the HCI environment via the network interface.

6. The NMC of claim 1, wherein the first set of shutdown instructions is already stored in the NMC before receiving the selection of the first set of shutdown instructions.

7. One or more non-transitory computer-readable media storing instructions that, when executed by one or more processors, cause the one or more processors to perform operations comprising:
 selecting, by a shutdown agent operating in a hyperconverged infrastructure (HCI) environment that uses a first HCI platform, a first set of shutdown instructions from a plurality of sets of shutdown instructions, each of the plurality of sets of shutdown instructions being supported for execution by a network management card (NMC) communicatively coupled with the HCI environment, the selected first set of the plurality of sets of shutdown instructions being configured to support shutdown processes compatible with the first HCI platform and at least a second set of the plurality of sets of shutdown instructions being configured to support shutdown processes compatible with a second HCI platform;
 sending the first set of shutdown instructions from the HCI environment to the NMC; and
 during a shutdown of the HCI environment after sending the first set of shutdown instructions to the NMC, sending a shutdown finalization instruction from the HCI environment to the NMC to finalize the shutdown, wherein the NMC is configured to finalize the shutdown, responsive to the shutdown finalization instruction, at least by executing the first set of shutdown instructions.

8. The one or more computer-readable media of claim 7, wherein selecting the first set of shutdown instructions comprises:
   detecting a particular HCI platform used by the HCI environment; and
   selecting the first set of shutdown instructions based at least on the first set of shutdown instructions supporting the particular HCI platform.

9. The one or more computer-readable media of claim 7, wherein selecting the first set of shutdown instructions comprises:
   presenting the plurality of sets of shutdown instructions in a user interface; and
   receiving, via the user interface, user input selecting the first set of shutdown instructions.

10. The one or more computer-readable media of claim 7, the operations further comprising:
    modifying the set of shutdown instructions responsive to user input corresponding to at least one custom instruction.

11. The one or more computer-readable media of claim 7, wherein the shutdown agent is a virtual shutdown agent (VSA) operating in a virtual machine in the HCI environment.

12. The one or more computer-readable media of claim 11, the operations further comprising:
    after sending the shutdown finalization instruction to the NMC to finalize the shutdown, the VSA terminating the virtual machine in which the VSA is operating.

13. The one or more computer-readable media of claim 7, the operations further comprising:
    selecting, by the shutdown agent, a replacement set of shutdown instructions from the plurality of sets of shutdown instructions; and
    sending the replacement set of shutdown instructions from the HCI environment to the NMC.

14. The one or more computer-readable media of claim 13, wherein the VSA is configured to communicate with the NMC using encrypted communication.

15. One or more non-transitory computer-readable media storing instructions that, when executed by one or more processors, cause the one or more processors to perform operations comprising: receiving, by a network management card (NMC) communicatively coupled with a hyperconverged infrastructure (HCI) environment that uses a first HCI platform, a selection of a first set of shutdown instructions from a plurality of sets of shutdown instructions, each of the plurality of sets of shutdown instructions being supported for execution by a network management card (NMC), the selected first set of the plurality of sets of shutdown instructions being configured to support shutdown processes compatible with the first HCI platform and at least a second set of the plurality of sets of shutdown instructions being configured to support shutdown processes compatible with a second HCI platform;

after receiving the selection of the first set of shutdown instructions, detecting, by the NMC, that the HCI environment is performing a shutdown, wherein detecting that the HCI environment is performing a shutdown comprises receiving a shutdown finalization instruction from a virtual shutdown agent (VSA) operating in a virtual machine in the HCI environment; and finalizing the shutdown, by the NMC, at least by the executing the first set of shutdown instructions.

16. The one or more non-transitory computer-readable media of claim 15, wherein finalizing the shutdown comprises performing one or more shutdown operations after all virtual machines in the HCI environment have shut down.

17. The one or more non-transitory computer-readable media of claim 15, wherein finalizing the shutdown comprises turning off power provided by an uninterrupted power supply (UPS) to the HCI environment.

18. The one or more non-transitory computer-readable media of claim 15, wherein receiving the selection of the first set of shutdown instructions comprises receiving contents of the first set of shutdown instructions from the HCI environment.

* * * * *